United States Patent
Hu et al.

(10) Patent No.: US 10,222,686 B2
(45) Date of Patent: Mar. 5, 2019

(54) LIGHT SOURCE SYSTEM AND PROJECTION SYSTEM

(71) Applicant: APPOTRONICS CORPORATION LIMITED, Shenzhen (CN)

(72) Inventors: Fei Hu, Shenzhen (CN); Haixiong Hou, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/749,697

(22) PCT Filed: Aug. 5, 2016

(86) PCT No.: PCT/CN2016/093400
§ 371 (c)(1),
(2) Date: Feb. 1, 2018

(87) PCT Pub. No.: WO2017/020855
PCT Pub. Date: Feb. 9, 2017

(65) Prior Publication Data
US 2018/0231883 A1 Aug. 16, 2018

(30) Foreign Application Priority Data
Aug. 6, 2015 (CN) .......................... 2015 1 0474632

(51) Int. Cl.
*G03B 21/20* (2006.01)
*G02B 27/10* (2006.01)
*G03B 21/28* (2006.01)

(52) U.S. Cl.
CPC ..... *G03B 21/2033* (2013.01); *G02B 27/1006* (2013.01); *G03B 21/20* (2013.01); *G03B 21/28* (2013.01)

(58) Field of Classification Search
CPC .... G03B 21/2033; G03B 21/20; G03B 21/28; G02B 27/1006
(Continued)

(56) References Cited

U.S. PATENT DOCUMENTS

2012/0242912 A1 9/2012 Kitano
2013/0322056 A1* 12/2013 Konuma ................. F21V 13/14
362/84
(Continued)

FOREIGN PATENT DOCUMENTS

CN 104020632 A 9/2014
CN 104020633 A 9/2014
(Continued)

OTHER PUBLICATIONS

Chinese Office Action, dated Dec. 29, 2017, in a counterpart Chinese patent application, No. CN 201510474632.6.
(Continued)

*Primary Examiner* — Steven H Whitesell Gordon
*Assistant Examiner* — Jerry Brooks
(74) *Attorney, Agent, or Firm* — Chen Yoshimura LLP

(57) ABSTRACT

A light source system and a projection system include a first laser array generating a red laser light; a second laser array generating a blue laser light; a beam-splitting plate located on a light path of the first and second laser arrays, for directing some of the red laser light and some of the blue laser light to a wavelength conversion device and directing some of the blue laser light to a light scattering device. The wavelength conversion device has wavelength conversion materials for receiving the blue laser light and producing a converted light, and for receiving and scattering the red laser light to form a first red light. The light scattering device has a scattering material for scattering the blue laser light to form a blue light. A light combining device forms a com-
(Continued)

bined light from the converted light, the first red light and the blue light.

10 Claims, 3 Drawing Sheets

(58) Field of Classification Search
USPC .......................................................... 353/31
See application file for complete search history.

(56) References Cited

U.S. PATENT DOCUMENTS

| | | |
|---|---|---|
| 2014/0354892 A1 | 12/2014 | Kitano |
| 2015/0109584 A1 | 4/2015 | Murai |
| 2015/0177599 A1 | 6/2015 | Huang |
| 2016/0026076 A1 | 1/2016 | Hu |
| 2016/0085143 A1 | 3/2016 | Hu et al. |

FOREIGN PATENT DOCUMENTS

| | | |
|---|---|---|
| CN | 104111532 A | 10/2014 |
| CN | 204028554 U | 12/2014 |
| JP | 2015108803 A | 6/2015 |
| TW | 201525605 A | 7/2015 |

OTHER PUBLICATIONS

Taiwanese Office Action, dated Dec. 8, 2016, in a counterpart Taiwanese patent application, No. TW 105119509.
International Search Report in the parent PCT application No. PCT/CN2016/093400, dated Oct. 28, 2016.
IPRP in the parent PCT application No. PCT/CN2016/093400, dated Feb. 6, 2018.
Chinese Office Action, dated Aug. 31, 2018, in a counterpart Chinese patent application, No. CN 201510474632.6.

* cited by examiner ated at a center of the beam splitting plate, and the second region surrounds the first region and is located outside of the first region;

wherein the first region directs at least a part of the red laser light to the wavelength conversion device;

wherein the first region directs at least a part of the blue laser light to the light scattering device; and wherein the second region directs at least another part of the blue laser light to the wavelength conversion device.

LIGHT SOURCE SYSTEM AND PROJECTION SYSTEM

BACKGROUND OF THE INVENTION

Field of the Invention

This invention relates to projection and display technologies, and in particular, it relates to light source systems and projection systems.

Description of Related Art

Conventional laser light source systems usually employ a laser light source to emit an excitation light, and use the excitation light to excite a phosphor material to generate a converted light. The color of the converted light is determined by the color characteristics of the phosphor material. For example, a red phosphor material can be excited to generate a red converted light, a yellow phosphor material can be excited to generate a yellow converted light, etc.

SUMMARY

However, due to inherent limitations of phosphor materials, the efficiency of generating a red converted light upon excitation is relatively low, so the amount of red light generated by wavelength conversion is low, and the color coordinates of the red converted light are also less than ideal, and the brightness is low. To achieve desired color gamut requirements, the red converted light needs to be color-corrected significantly, which further lowers the efficiency of red light generation of the light source system. The other color lights (e.g., blue and green lights) generated by the light source system may be oversupplied, and the excessive amounts of the other color lights need to be filtered out, which lowers the effective utilization rate of the other color lights. Thus, the low efficiency of the red converted light generation by the red phosphor material and its non-ideal color coordinates cause lower light output efficiency of the entire light source system.

Accordingly, the present invention is directed to a light source system and projection system that substantially solves the above problems of the conventional technologies, i.e. low efficiency in red light generation and non-ideal color coordinates. To achieve the above objectives, the present invention provides:

A light source system, which includes:

a first laser array for generating a red laser light;

a second laser array for generating a blue laser light;

a beam splitting plate located on a light path of the first laser array and the second laser array, for directing at least a part of the red laser light and at least a part of the blue laser light to a wavelength conversion device;

wherein the beam splitting plate further directs at least a part of the blue laser light to a light scattering device;

wherein the wavelength conversion device includes wavelength conversion materials for receiving the blue laser light and generating a converted light, and for receiving and scattering the red laser light to form a first red light;

wherein the light scattering device includes a scattering material for scattering the blue laser light to produce a blue light; and a light combining device for combining the converted light, the first red light and the blue light into a combined light.

In one embodiment, the beam splitting plate includes a first region and a second region, wherein the first region is located at a center of the beam splitting plate, and the second region surrounds the first region and is located outside of the first region;

wherein the first region directs at least a part of the red laser light to the wavelength conversion device;

wherein the first region directs at least a part of the blue laser light to the light scattering device; and wherein the second region directs at least another part of the blue laser light to the wavelength conversion device.

In one embodiment, the converted light includes at least a non-blue converted light;

wherein the light combining device is the beam splitting plate, wherein the beam splitting plate directs at least a part of the converted light, at least a part of the first red light, and at least a part of the blue light to a common output path, wherein the converted light, the first red light, and the blue light form a combined light beam which is output from the output path.

In one embodiment, the wavelength conversion device and the light scattering device are respectively disposed on two opposite sides of the beam splitting plate; and wherein the beam splitting plate is disposed at a slant angle relative to a first optical axis of the red laser light that is incident on the beam splitting plate, and the beam splitting plate is disposed at a slant angle relative to a second optical axis of the blue laser light that is incident on the beam splitting plate.

In one embodiment, the first optical axis is parallel to the second optical axis;

wherein a plane of the wavelength conversion device is perpendicular to the second optical axis, and a plane of the light scattering device is parallel to the second optical axis;

wherein the first region transmits the red laser light incident on the first region to the wavelength conversion device, which produces the first red light, and wherein the second region reflects at least a part of the first red light to a direction perpendicular to the second optical axis to be output;

wherein the second region transmits the blue laser light incident on the second region to the wavelength conversion device, which generates the converted light, and wherein the second region reflects at least a part of the converted light to the direction perpendicular to the second optical axis to be output; and wherein the first region further reflects the blue laser light incident on the first region to the light scattering device, which produces the blue light, and wherein the second region transmits at least a part of the blue light to the direction perpendicular to the second optical axis to be output.

In one embodiment, the first optical axis is parallel to the second optical axis;

wherein a plane of the wavelength conversion device is parallel to the second optical axis, and a plane of the light scattering device is perpendicular to the second optical axis;

wherein the first region reflects the red laser light incident on the first region to the wavelength conversion device, which produces the first red light, and wherein the second region transmits at least a part of the first red light to a direction perpendicular to the second optical axis to be output;

wherein the second region reflects the blue laser light incident on the second region to the wavelength conversion device, which generates the converted light, and the second region transmits at least a part of the converted light to the direction perpendicular to the second optical axis to be output; and wherein the first region transmits the blue laser light incident on the first region to the light scattering device, which produces the blue light, and the second region reflects at least a part of the blue light to the direction perpendicular to the second optical axis to be output.

In one embodiment, the first optical axis is perpendicular to the second optical axis;

wherein a plane of the wavelength conversion device is perpendicular to the second optical axis, and a plane of the light scattering device is parallel to the second optical axis;

wherein the first region reflects the red laser light incident on the first region to the wavelength conversion device, which produces the first red light, and wherein the second region reflects at least a part of the first red light to a direction perpendicular to the second optical axis to be output;

wherein the second region transmits the blue laser light incident on the second region to the wavelength conversion device, which generates the converted light, and wherein the second region reflects at least a part of the converted light to the direction perpendicular to the second optical axis to be output; and wherein the first region further reflects the blue laser light incident on the first region to the light scattering device, which produces the blue light, and wherein the second region transmits at least a part of the blue light to the direction perpendicular to the second optical axis to be output.

In one embodiment, the first optical axis is perpendicular to the second optical axis;

wherein a plane of the wavelength conversion device is parallel to the second optical axis, and a plane of the light scattering device is perpendicular to the second optical axis;

wherein the first region transmits the red laser light incident on the first region to the wavelength conversion device, which produces the first red light, and wherein the second region transmits at least a part of the first red light to a direction perpendicular to the second optical axis to be output;

wherein the second region reflects the blue laser light incident on the second region to the wavelength conversion device, which generates the converted light, and wherein the second region transmits at least a part of the converted light to the direction perpendicular to the second optical axis to be output; and wherein the first region further transmits the blue laser light incident on the first region to the light scattering device, which produces the blue light, and wherein the second region reflects at least a part of the blue light to the direction perpendicular to the second optical axis to be output.

In one embodiment, the light source system is based on any of the above embodiment, and further includes:

a third laser array, for generating another blue laser light that is closer to a standard blue color than the blue laser light generated by the second laser array;

wherein the beam splitting plate further directs the blue laser light generated by the third laser array to the light scattering device; and wherein the blue laser light generated by the second laser array has a higher excitation efficiency for exciting the phosphor materials than that of the blue laser light generated by the third laser array.

Another embodiment of the present invention provides a projection system which employs the light source system of the above embodiments.

The above light source systems and projection systems, where the first laser array is used to generate a red laser light, where the red laser light is scattered by the wavelength conversion device to become a first red light, and the first red light is combined into the combined light, can not only increase the light source system's efficiency in red light generation, but also use the first red light to effectuate a color correction of the red component of the converted light so that the red component in the combined light has desired color coordinates.

BRIEF DESCRIPTION OF THE DRAWINGS

To more clearly explain embodiments of the present invention or conventional technologies, the following drawings are used to illustrate the embodiments or conventional technologies. Those of ordinary skill in the art will be able to obtain other illustrations based the drawings and descriptions below without creative work.

DETAILED DESCRIPTION OF PREFERRED EMBODIMENTS

Embodiments of the present invention are described clearly and completely below with reference to the drawings. These described embodiments are only some of the embodiments of the present invention and are not all possible embodiments. Based on the described embodiments, those of ordinary skill in the relevant art will be able to obtain other embodiments without creative work, and all such embodiments are within the scope of this invention.

Figure 1:
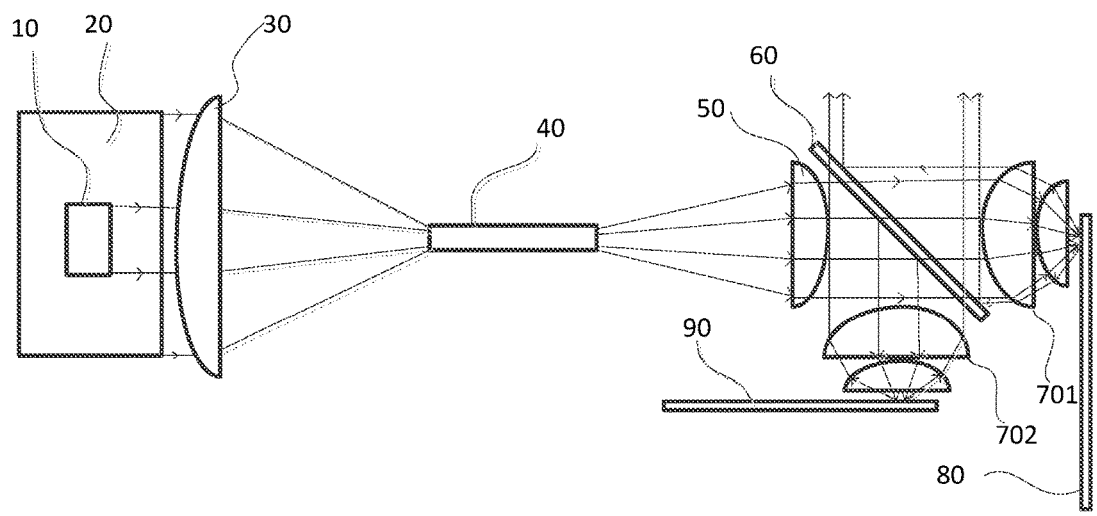
FIG. 1 schematically illustrates the structure of a light source system according to an embodiment of the present invention.

Refer to FIG. 1, which schematically illustrates the structure of a light source system according to an embodiment of the present invention. As shown in FIG. 1, in this embodiment, the light source system includes a first laser array 10, a second laser array 20, a first light collecting device 30, a light homogenizing device 40, a light relay device 50, a beam splitting plate 60, a second light collecting device 701, a third light collecting device 702, a wavelength conversion device 80, and a light scattering device 90.

The first laser array 10 generates a red laser light. The second laser array 20 generates a blue laser light. The red laser light generated by the first laser array 10 and the blue laser light generated by the second laser array 20 are condensed by the first light collecting device 30, and the condensed red laser light and blue laser light are input into the light homogenizing device 40. The light homogenizing device 40 homogenizes the input red laser light and blue laser light, and the homogenized red laser light and blue laser light are output to the light relay device 50 and then to the beam splitting plate 60. In one embodiment, the light relay device 50 may include a lens or other devices having light condensing functions.

The beam splitting plate 60 is located on the light path of the first laser array 10 and the second laser array 20, and directs at least a part of the red laser light generated by the first laser array 10 and at least a part of the blue laser light generated by the second laser array 20 to the wavelength conversion device 80. The beam splitting plate 60 also directs at least a part of the blue laser light generated by the second laser array 20 to the light scattering device 90.

The wavelength conversion device 80 includes wavelength conversion materials, which receive the blue laser light and convert it to converted lights. The wavelength conversion device 80 further receives and scatters the red laser light to form a first red light.

The light scattering device 90 includes a scattering material, which scatters the blue laser light that has been directed to the light scattering device 90 by the beam splitting plate 60, to form a scattered blue light.

The above converted lights include at least a non-blue converted light. The beam splitting plate 60 further directs at least a part of the converted light and at least a part of the first red light from the wavelength conversion device 80, and at least a part of the blue light from the light scattering device 90, to a common light output path, so the converted light, the first red light and the blue light are combined into one beam which is output from the light output path.

In one embodiment, the wavelength conversion materials include a yellow phosphor material. The blue excitation light excites the yellow phosphor material to generate a yellow converted light. Thus, the light source system can ultimately generate a white combined light.

In the above described light source system and projection system, by using the first laser array that generates a red laser light, the red laser light is scattered by the wavelength conversion device to form the first red light, and the first red light is combined into the combined output light. This can not only increase the light source system's efficiency in red light generation, but also use the first red light to effectuate a color correction of the red light so that the red component in the combined light has desired color coordinates.

In one embodiment, the light source system further includes a third laser array (not shown in FIG. 1), for generating another blue laser light that is closer to a standard blue color than the blue laser light generated by the second laser array 20. The standard blue color obeys the standard set by the CIE (Commission Internationale de L'Eclairage), and can be regarded as a standard blue color under the CIE standard.

In this embodiment, the blue laser light generated by the second laser array 20 has a higher excitation efficiency for exciting phosphor materials than that of the blue laser light generated by the third laser array.

For example, the second laser array 20 may generate a blue laser light having a wavelength of 445 nm, while the third laser array may generate a blue laser light having a wavelength of 465 nm.

In the following descriptions, the blue laser light generated by the second laser array is referred to as the second blue laser light and the blue laser light generated by the third laser array is referred to as the third blue laser light.

In this embodiment, the beam splitting plate 60 is further used to direct the blue laser light generated by the third laser array to the light scattering device 90, to produce a blue light that is closer to the standard blue color, and that blue light is combined into the combined output light.

In the above described light source system, by using a blue laser light that has a higher phosphor excitation efficiency to excite the phosphor material, a higher amount of converted light of the desired color can be obtained. Further, the combined light includes another blue light that is closer to the standard blue color, which effectuates a color correction for the blue light having higher phosphor excitation efficiency in the combined light.

In the above described light source system, any one or more of the first light collecting device 30, the light homogenizing device 40, the light relay device 50 the second light collecting device 701 and the third light collecting device 702 may be omitted based on practical need, or be replaced with other optical devices having the same or similar functions.

In the above described light source system, the beam splitting plate 60 acts as a beam combining device, and has a beam combining function. In other embodiments, the beam splitting plate 60 does not have to perform the beam combining function. Such a light source system may use other beam combining devices, rather than the beam splitting plate 60, to combine the converted light, the first red light and the blue light into the combined light. In this embodiment, the converted light is not limited to one that includes at least a non-blue converted light.

Figure 2:
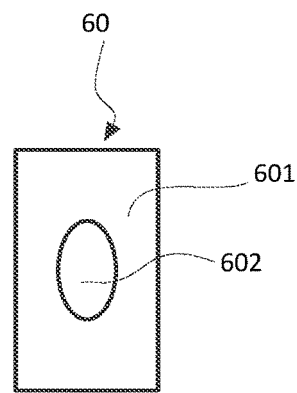
FIG. 2 schematically illustrates the structure of a beam splitting plate according to an embodiment of the present invention.

As shown in FIG. 2, in one embodiment, the beam splitting plate 60 includes a first region 601 and a second region 602. The first region 601 is located at the center of the beam splitting plate 60, and the second region 602 surrounds the first region 601 and is located outside of the first region 601.

In this embodiment, at least a part of the red laser light generated by the first laser array 10 is incident on the first region 601, and the first region 601 directs the at least part of the red laser light to the wavelength conversion device 80.

At least a part of the blue laser light generated by the second laser array 20 is incident on the first region 601, and the first region 601 directs the at least part of the blue laser light to the light scattering device 90.

At least another part of the blue laser light generated by the second laser array 20 is incident on the second region 602, and the second region 602 directs the at least another part of the blue laser light to the wavelength conversion device 80.

In the light source system of this embodiment, the first region 601 at the center of the beam splitting plate 60 directs the red laser light to the wavelength conversion device 80, which can increase the utilization efficiency of the red laser light.

Based on this embodiment, the light source system can additionally include the above described third laser array. At least a part of the third blue laser light is incident on the first region 601, and is directed by the first region 601 to the light scattering device 90.

In one embodiment, the wavelength conversion device 80 and the light scattering device 90 are respectively located on two opposite sides of the beam splitting plate 60. The beam splitting plate 60 is disposed at a slant angle relative to a first optical axis of the red laser light that is incident on the beam splitting plate 60, and the beam splitting plate 60 is also disposed at a slant angle relative to a second optical axis of the blue laser light that is incident on the beam splitting plate 60.

In one embodiment, the beam splitting plate 60 is disposed at a 45-degree angle relative to the first optical axis of the red laser light that is incident on the beam splitting plate 60, and the beam splitting plate 60 is disposed at a 45-degree angle relative to the second optical axis of the blue laser light that is incident on the beam splitting plate 60.

Based on the above embodiments, some more specific embodiments of the light source system are described below.

First Embodiment

The first optical axis is parallel to the second optical axis. The plane of the wavelength conversion device 80 is perpendicular to the second optical axis. The plane of the light scattering device 90 is parallel to the second optical axis.

Refer to FIG. 1, which illustrates a light source system as one example of this embodiment.

In this embodiment, the first region 601 transmits the red laser light incident on the first region 601 to the wavelength conversion device 80, which produces the first red light, and the second region 602 reflects at least a part of the first red light to a direction perpendicular to the second optical axis to be output.

The second region 602 transmits the blue laser light incident on the second region 602 to the wavelength conversion device 80, which generates the converted light, and the second region 602 reflects at least a part of the converted light to the direction perpendicular to the second optical axis to be output.

The first region 601 further reflects the blue laser light incident on the first region 601 to the light scattering device, to produce the blue light, and the second region 602 transmits at least a part of that blue light to the direction perpendicular to the second optical axis to be output.

Using the example of a wavelength conversion device 80 where the wavelength conversion materials include a yellow phosphor material, the converted light is a yellow converted light (which contains a red converted light a green converted light). The second region 602 reflects the red converted light and the green converted light, and the first region 601 reflects the green converted light. The first laser array 10 in FIG. 1 may include multiple laser units, and the second laser array 20 may also include multiple laser units. The multiple laser units of the second laser array 20 are distributed around the multiple laser units of the first laser array 10, i.e., the first laser array 10 is located inside at the center of the distribution area of the second laser array. This structure can improve light utilization efficiency.

The laser units of the first laser array 10 and the laser units of the second laser array 20 may be distributed on the same plane, or on different planes. In other embodiments, the relative positions of the first laser array 10 and the second laser array 20 may have other arrangements, for example, the first laser array 10 may not be located inside at the center of the distribution area of the second laser array 20, etc.

Second Embodiment

Based on the light source system of the first embodiment, the above described third laser array is added.

The multiple laser units of the second laser array 20 may be located around the multiple laser units of the third laser array, i.e., the third laser array is located inside at the center of the distribution area of the second laser array 20. When the first laser array is also located inside at the center of the distribution area of the second laser array 20, the laser units of the third laser array and the laser units of the first laser array 10 may be arranged in a mixed configuration.

In this embodiment:

At least a part of the blue laser light generated by the third laser array is incident on the first region 601. The first region 601 reflects the third blue laser light incident on the first region 601 to the light scattering device 90, and the second region 602 reflects the blue light produced from the third blue laser light from the light scattering device 90.

At least a part of the red laser light generated by the first laser array 10 is transmitted by the first region 601 to the wavelength conversion device 80, producing the first red light, and at least a part of the first red light is reflected by the second region 602 to the direction perpendicular to the second optical axis to be output.

At least a part of the blue laser light generated by the second laser array 20 is transmitted by the first region 601 to the wavelength conversion device 80, and least another part of the blue laser light generated by the second laser array 20 is transmitted by the second region 602 to the wavelength conversion device 80, to generate a yellow converted light (which contains a red converted light and a green converted light). The first region 601 reflects the green converted light, and the second region 602 reflects the green converted light and the red converted light.

Third Embodiment

The positions of the wavelength conversion device 80 and the light scattering device 90 are exchanged. The plane of the wavelength conversion device 80 is parallel to the second optical axis, and the plane of the light scattering device 90 is perpendicular to the second optical axis.

In this embodiment, the 601 reflects the red laser light incident on the first region 601 to the wavelength conversion device 80, producing the first red light, and the second region 602 transmits at least a part of the first red light to a direction perpendicular to the second optical axis to be output.

The second region 602 reflects the blue laser light incident on the second region 602 to the wavelength conversion device 80, to generate a converted light, and the second region 602 transmits at least a part of the converted light to the direction perpendicular to the second optical axis to be output. The converted light is a yellow converted light (which contains a red converted light and a green converted light). The second region 602 transmits the red converted light and the green converted light. The first region 601 transmits the green converted light.

The first region 601 transmits the blue laser light incident on the first region 601 to the light scattering device 90, producing a blue light, and the second region 602 reflects at least a part of this blue light to the direction perpendicular to the second optical axis to be output.

Fourth Embodiment

Based on the light source system of the third embodiment, the above described third laser array is added. The multiple laser units of the second laser array 20 may be located around the multiple laser units of the third laser array, i.e., the third laser array is located inside at the center of the distribution area of the second laser array 20.

In this embodiment, at least a part of the third laser light is incident on the first region 601. The first region 601 transmits the third blue laser light incident on the first region 601 to the light scattering device 90, and the second region 602 reflects the blue light reflects the blue light produced from the third blue laser light from the light scattering device 90.

At least a part of the red laser light generated by the first laser array 10 is reflected by the first region 601 to the wavelength conversion device 80, to produce the first red light, and at least a part of the first red light is transmitted by the second region 602 to the direction perpendicular to the second optical axis to be output.

At least a part of the blue laser light generated by the second laser array 20 is reflected by the first region 601 to the wavelength conversion device 80, and at least another part of the blue laser light generated by the second laser array 20 is reflected by the second region 602 to the wavelength conversion device 80, to generate the yellow converted light (which contains a red converted light and a green converted light). The first region 601 transmits the green converted light, and the second region 602 transmits the green converted light and the red converted light.

Fifth Embodiment

The first optical axis is perpendicular to the second optical axis. The plane of the wavelength conversion device 80 is perpendicular to the second optical axis, and the plane of the light scattering device 90 is parallel to the second optical axis.

Figure 3:
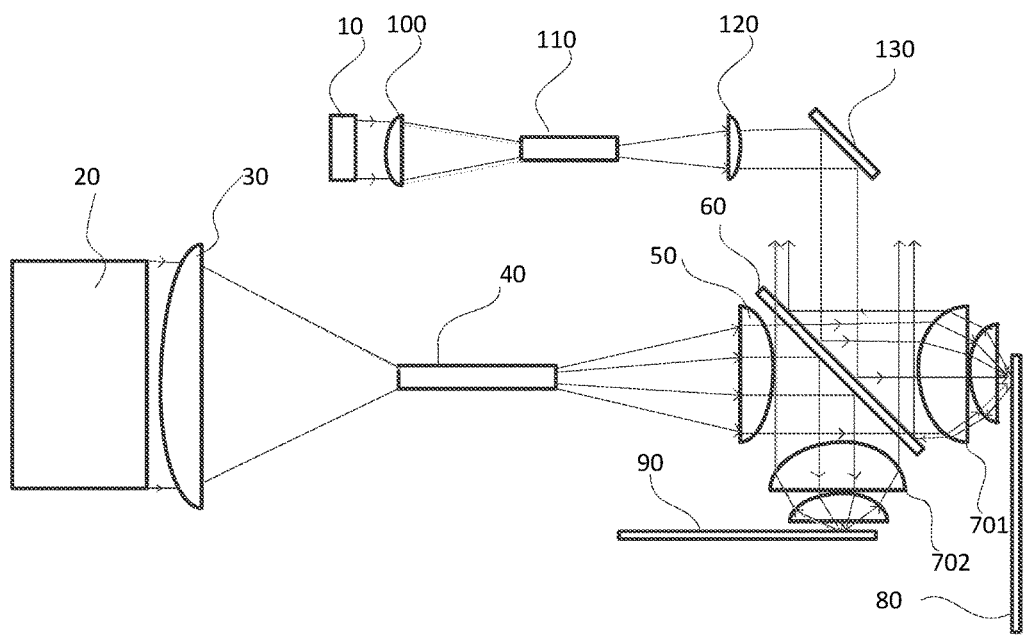
FIG. 3 schematically illustrates the structure of a light source system according to another embodiment of the present invention.

Refer to FIG. 3, which illustrates a light source system as one example of this embodiment.

In this embodiment, the first region 601 and the second region 602 of the beam splitting plate 60 direct lights in the same manner as in the first embodiment, with the following exception:

In the first embodiment, the first region 601 transmits red laser light, while in this embodiment, the first region 601 reflects red laser light.

As shown in FIG. 3, in one embodiment, the light source system further includes a fourth light collecting device 100, a light homogenizing device 110, a light relay device 120, and a light guiding plate 130. One or more of the fourth light collecting device 100, the light homogenizing device 110 and the light relay device 120 may be omitted based on practical need, or may be replaced by other devices with the same or similar optical functions.

In the system of FIG. 3, the first laser array 10 and the second laser array 20 are arranged separately from each other, and the optical axis of the output light of the first laser array 10 is parallel to the optical axis of the output light of the second laser array 20.

The red laser light generated by the first laser array 10 is condensed by the fourth light collecting device 100, and the condensed red laser light is inputted to the 110. The light homogenizing device 110 homogenizes the red laser light, and the homogenized red laser light is passes through the light relay device 120 to be input onto the light guiding plate 130. The light relay device 120 may include a lens or other optical devices having a light condensing function.

The light guiding plate 130 is disposed at a 45-degree angle with respect to the optical axis of the output light of the first laser array 10. The light guiding plate 130 includes a beam splitting region, which reflects the red laser light generated by the first laser array 10 to the first region 601 of the beam splitting plate 60. In one embodiment, the beam splitting region transmits the blue scattered light, and transmits color components of the converted light other than the red converted light. For example, the converted light may be a yellow converted light (which contains a red converted light a green converted light), and the light guiding plate 130 transmits the green converted light. In one embodiment, in addition to the beam splitting region, the light guiding plate 130 also includes an anti-reflective region, which increases the light transmittance of the regions other than the beam splitting region. This increases the output efficiency of the combined light.

The light source system shown in FIG. 3 is an example of system that meets the following requirements: The beam splitting plate 60 is disposed at a 45-degree angle with respect to the first optical axis of the red laser light which is generated by the first laser array 10 and incident on the beam splitting plate 60. The second optical axis of the blue laser light which is generated by the second laser array 20 and incident on the beam splitting plate 60 is perpendicular to the first optical axis. The light source system of the invention is not limited to the illustrated embodiment, and other light source systems that meet the above requirements are also within the scope of the invention.

Figure 4:
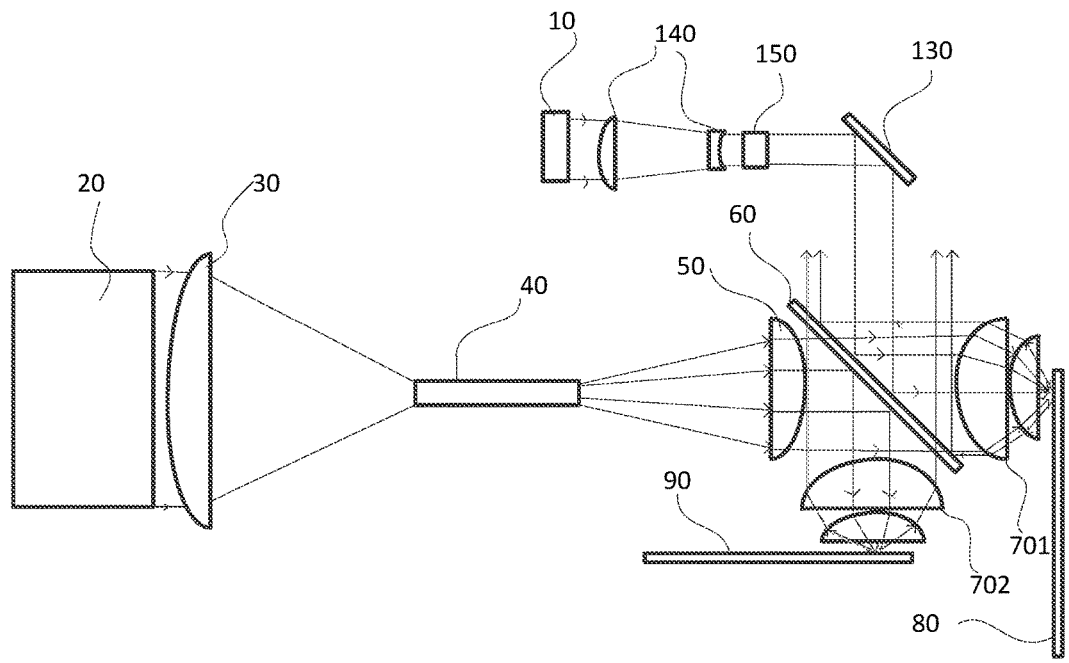
FIG. 4 schematically illustrates the structure of a light source system according to yet another embodiment of the present invention.

In another embodiment, as shown in FIG. 4, the fourth light collecting device 100, the light homogenizing device 110 and the light relay device 120 shown in FIG. 3 are replaced by a light spot compression system 140 and a fly-eye lens 150 of FIG. 4. The red laser light generated by the first laser array 10 is compressed by the light spot compression system 140, and the compressed red laser light is inputted to the fly-eye lens 150, which homogenizes and re-shapes the red laser light. The homogenized and re-shaped red laser light is input to the light guiding plate 130. The light spot compression system 140 may include one or more optical elements.

Sixth Embodiment

Figure 5:
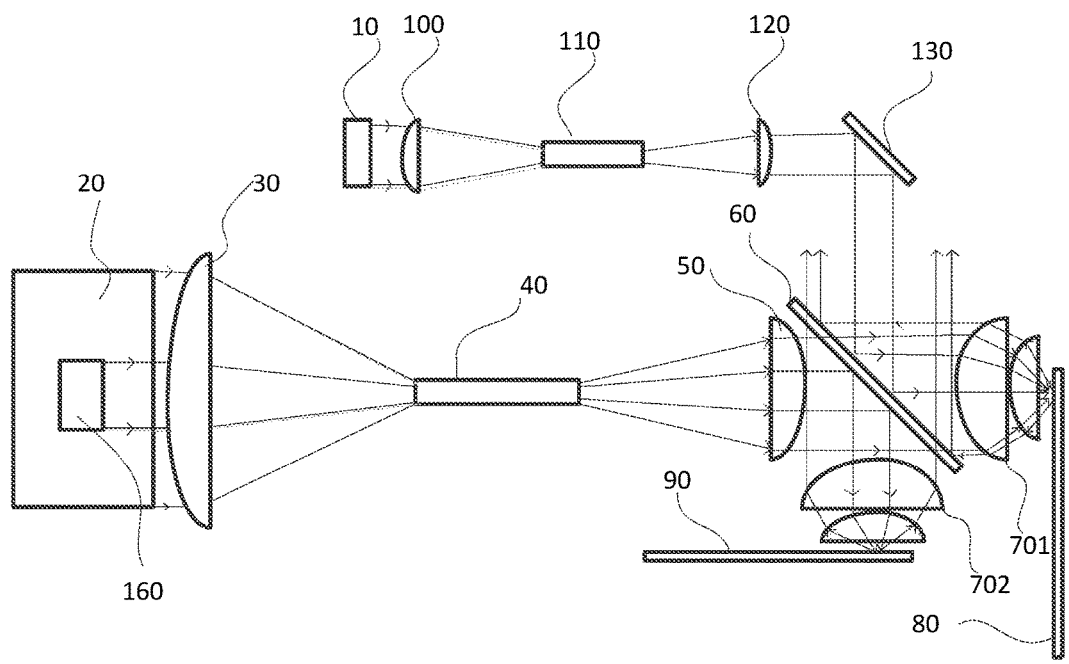
FIG. 5 schematically illustrates the structure of a light source system according to yet another embodiment of the present invention.

Based on the light source system of the fifth embodiment, the above described third laser array is added. As shown in FIG. 5, the multiple laser units of the second laser array 20 may be located around the multiple laser units of the third laser array 160, i.e., the third laser array 160 is located inside at the center of the distribution area of the second laser array 20.

At least a part of the blue laser light generated by the third laser array 160 is incident on the first region 601.

In this embodiment, the first region 601 and the second region 602 of the beam splitting plate 60 direct lights in the same manner as in the second embodiment, with the following exception:

In the second embodiment, the first region 601 transmits the red laser light, while in this embodiment, the first region 601 reflects the red laser light.

Seventh Embodiment

Based on the fifth embodiment, the positions of the wavelength conversion device 80 and the light scattering device 90 are exchanged. The plane of the wavelength conversion device 80 is parallel to the second optical axis, and the plane of the light scattering device 90 is perpendicular to the second optical axis.

In this embodiment, the first region 601 and the second region 602 of the beam splitting plate 60 direct lights in the same manner as in the third embodiment, with the following exception:

In the third embodiment, the first region 601 reflects the red laser light, while in this embodiment, the first region 601 transmits the red laser light.

Eighth Embodiment

Based on the light source system of the seventh embodiment, the above described third laser array is added. The multiple laser units of the second laser array 20 may be located around the multiple laser units of the third laser array, i.e., the third laser array is located inside at the center of the distribution area of the second laser array 20.

At least a part of the blue laser light generated by the third laser array is incident on the first region 601.

In this embodiment, the first region 601 and the second region 602 of the beam splitting plate 60 direct lights in the same manner as in the fourth embodiment, with the following exception:

In the fourth embodiment, the first region 601 reflects the red laser light, while in this embodiment, the first region 601 transmits the red laser light.

The present invention also provides a projection system, which employs a light source system of any of the above embodiments.

The multiple embodiments are described in this disclosure in a progressive manner, where the descriptions of each embodiment focus on its differences from other embodiments. The similar aspects of the multiple embodiments can be understood by referring to each other. The methods related to corresponding devices are not described in detail but can be understood from the descriptions of the devices.

It will be apparent to those skilled in the art that various modification and variations can be made in the light source systems of the present invention without departing from the spirit or scope of the invention. Thus, it is intended that the present invention cover modifications and variations that come within the scope of the appended claims and their equivalents.

What is claimed is:

1. A light source system, comprising: a first laser array for generating a red laser light; a second laser array for generating a blue laser light; a beam splitting plate located on a light path of the first laser array and the second laser array, for directing at least a part of the red laser light and at least a part of the blue laser light to a wavelength conversion device; wherein the beam splitting plate further directs at least a part of the blue laser light to a light scattering device; wherein the wavelength conversion device includes wavelength conversion materials for receiving the blue laser light and generating a converted light, and for receiving and scattering the red laser light to form a first red light; wherein the light scattering device includes a scattering material for scattering the blue laser light to produce a blue light; and a light combining device for combining the converted light, the first red light and the blue light into a combined light, wherein the light combining device is the beam splitting plate.

2. The light source system of claim 1, wherein the beam splitting plate includes a first region and a second region, wherein the first region is located at a center of the beam splitting plate, and the second region surrounds the first region and is located outside of the first region;
   wherein the first region directs at least a part of the red laser light to the wavelength conversion device;
   wherein the first region directs at least a part of the blue laser light to the light scattering device; and
   wherein the second region directs at least another part of the blue laser light to the wavelength conversion device.

3. The light source system of claim 2, wherein the converted light includes at least a non-blue converted light; wherein the beam splitting plate directs at least a part of the converted light, at least a part of the first red light, and at least a part of the blue light to a common output path, wherein the converted light, the first red light, and the blue light form a combined light beam which is output from the output path.

4. The light source system of claim 3, wherein the wavelength conversion device and the light scattering device are respectively disposed on two opposite sides of the beam splitting plate; and
   wherein the beam splitting plate is disposed at a slant angle relative to a first optical axis of the red laser light that is incident on the beam splitting plate, and the beam splitting plate is disposed at a slant angle relative to a second optical axis of the blue laser light that is incident on the beam splitting plate.

5. The light source system of claim 4, wherein the first optical axis is parallel to the second optical axis;
   wherein a plane of the wavelength conversion device is perpendicular to the second optical axis, and a plane of the light scattering device is parallel to the second optical axis;
   wherein the first region transmits the red laser light incident on the first region to the wavelength conversion device, which produces the first red light, and wherein the second region reflects at least a part of the first red light to a direction perpendicular to the second optical axis to be output;
   wherein the second region transmits the blue laser light incident on the second region to the wavelength conversion device, which generates the converted light, and wherein the second region reflects at least a part of the converted light to the direction perpendicular to the second optical axis to be output; and
   wherein the first region further reflects the blue laser light incident on the first region to the light scattering device, which produces the blue light, and wherein the second region transmits at least a part of the blue light to the direction perpendicular to the second optical axis to be output.

6. The light source system of claim 4, wherein the first optical axis is parallel to the second optical axis;
   wherein a plane of the wavelength conversion device is parallel to the second optical axis, and a plane of the light scattering device is perpendicular to the second optical axis;
   wherein the first region reflects the red laser light incident on the first region to the wavelength conversion device, which produces the first red light, and wherein the second region transmits at least a part of the first red light to a direction perpendicular to the second optical axis to be output;
   wherein the second region reflects the blue laser light incident on the second region to the wavelength conversion device, which generates the converted light, and the second region transmits at least a part of the converted light to the direction perpendicular to the second optical axis to be output; and
   wherein the first region transmits the blue laser light incident on the first region to the light scattering device, which produces the blue light, and the second region reflects at least a part of the blue light to the direction perpendicular to the second optical axis to be output.

7. The light source system of claim 4, wherein the first optical axis is perpendicular to the second optical axis;
   wherein a plane of the wavelength conversion device is perpendicular to the second optical axis, and a plane of the light scattering device is parallel to the second optical axis;
   wherein the first region reflects the red laser light incident on the first region to the wavelength conversion device, which produces the first red light, and wherein the second region reflects at least a part of the first red light to a direction perpendicular to the second optical axis to be output;
   wherein the second region transmits the blue laser light incident on the second region to the wavelength conversion device, which generates the converted light, and wherein the second region reflects at least a part of the converted light to the direction perpendicular to the second optical axis to be output; and
   wherein the first region further reflects the blue laser light incident on the first region to the light scattering device, which produces the blue light, and wherein the second region transmits at least a part of the blue light to the direction perpendicular to the second optical axis to be output.

8. The light source system of claim 4, wherein the first optical axis is perpendicular to the second optical axis;

wherein a plane of the wavelength conversion device is parallel to the second optical axis, and a plane of the light scattering device is perpendicular to the second optical axis;

wherein the first region transmits the red laser light incident on the first region to the wavelength conversion device, which produces the first red light, and wherein the second region transmits at least a part of the first red light to a direction perpendicular to the second optical axis to be output;

wherein the second region reflects the blue laser light incident on the second region to the wavelength conversion device, which generates the converted light, and wherein the second region transmits at least a part of the converted light to the direction perpendicular to the second optical axis to be output; and wherein the first region further transmits the blue laser light incident on the first region to the light scattering device, which produces the blue light, and wherein the second region reflects at least a part of the blue light to the direction perpendicular to the second optical axis to be output.

9. The light source system of claim 1, further comprising:
a third laser array, for generating another blue laser light that is closer to a standard blue color than the blue laser light generated by the second laser array;

wherein the beam splitting plate further directs the blue laser light generated by the third laser array to the light scattering device; and wherein the blue laser light generated by the second laser array has a higher excitation efficiency for exciting the phosphor materials than that of the blue laser light generated by the third laser array.

10. A projection system, comprising the light source system of claim 9.

* * * * *